United States Patent
Ishikawa et al.

(10) Patent No.: US 8,553,927 B2
(45) Date of Patent: Oct. 8, 2013

(54) IMAGE PROCESSING DEVICE AND METHOD FOR DETERMINING IMAGE DATA PROCESSES BASED ON ADDITIONAL INFORMATION

(75) Inventors: Masaaki Ishikawa, Tokyo (JP); Satoshi Nakamura, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1070 days.

(21) Appl. No.: 12/289,564

(22) Filed: Oct. 30, 2008

(65) Prior Publication Data

US 2009/0116690 A1    May 7, 2009

(30) Foreign Application Priority Data

Nov. 2, 2007 (JP) ................................ 2007-286729
Oct. 16, 2008 (JP) ................................ 2008-267838

(51) Int. Cl.
G06K 9/00 (2006.01)
G06K 9/54 (2006.01)
G06K 9/60 (2006.01)

(52) U.S. Cl.
USPC .......................................... 382/100; 382/305

(58) Field of Classification Search
USPC ......... 382/100, 181, 189–190, 195, 209, 220, 382/224, 227, 282, 305; 715/205, 723, 762; 725/105; 707/3, 6; 345/156, 30; 354/410

See application file for complete search history.

(56) References Cited

U.S. PATENT DOCUMENTS

| | | | |
|---|---|---|---|
| 5,647,010 A * | 7/1997 | Okubo et al. | 382/100 |
| 7,002,709 B1 | 2/2006 | Terada et al. | |
| 7,437,022 B2 * | 10/2008 | Uchida et al. | 382/305 |
| 7,792,325 B2 * | 9/2010 | Rhoads et al. | 382/100 |
| 2004/0190750 A1 * | 9/2004 | Rodriguez et al. | 382/100 |
| 2006/0059198 A1 * | 3/2006 | Uchida et al. | 707/104.1 |
| 2007/0045427 A1 * | 3/2007 | Onishi | 235/494 |
| 2007/0076261 A1 * | 4/2007 | Ito | 358/3.28 |
| 2007/0091351 A1 * | 4/2007 | Okamoto et al. | 358/1.14 |

(Continued)

FOREIGN PATENT DOCUMENTS

| | | |
|---|---|---|
| CN | 1956486 | 5/2007 |
| JP | 3252563 | 11/2001 |

(Continued)

OTHER PUBLICATIONS

Uncoy.com. "Exif Photo Orientation and OS X." Sep. 7, 2006; http://uncoy.com/2006/09/photo_orientati.html; retrieved on Jan. 30, 2009.

(Continued)

*Primary Examiner* — Shefali Goradia
(74) *Attorney, Agent, or Firm* — Harness, Dickey & Pierce, P.L.C.

(57) ABSTRACT

An image processing device extracts additional information from image data and includes an input unit to input a plurality of image data items, an additional information extracting unit to extract an additional information item from each image data item, and a determining unit to determine a process to be performed for each image data item based on the extracted additional information item. The determining unit is configured to determine a process to be performed for an image-data group containing the plurality of image data items, based on a plurality of additional information items extracted from the plurality of image data items, and determine a process to be performed for each image data item based on one of the plurality of additional information items.

14 Claims, 14 Drawing Sheets

(56) References Cited

U.S. PATENT DOCUMENTS

| | | | |
|---|---|---|---|
| 2007/0192872 A1* | 8/2007 | Rhoads et al. | 726/26 |
| 2007/0236728 A1* | 10/2007 | Kobayashi et al. | 358/1.15 |
| 2007/0258098 A1 | 11/2007 | Matsushima | |
| 2009/0116690 A1* | 5/2009 | Ishikawa et al. | 382/100 |
| 2010/0103470 A1* | 4/2010 | Harada | 358/3.28 |

FOREIGN PATENT DOCUMENTS

| | | |
|---|---|---|
| JP | 2004-200962 | 7/2004 |
| JP | 2004-274092 | 9/2004 |
| JP | 2006-270357 | 10/2006 |
| JP | 2007-60242 | 3/2007 |
| JP | 2007-088796 | 4/2007 |

OTHER PUBLICATIONS

European Search Report.
Chinese Office Action dated Sep. 14, 2010 and English translation thereof.
Abstract for JP 07-114299 published May 2, 1995.
Japanese Office Action for corresponding application 2008-0267838 dated Jun. 12, 2012.

* cited by examiner

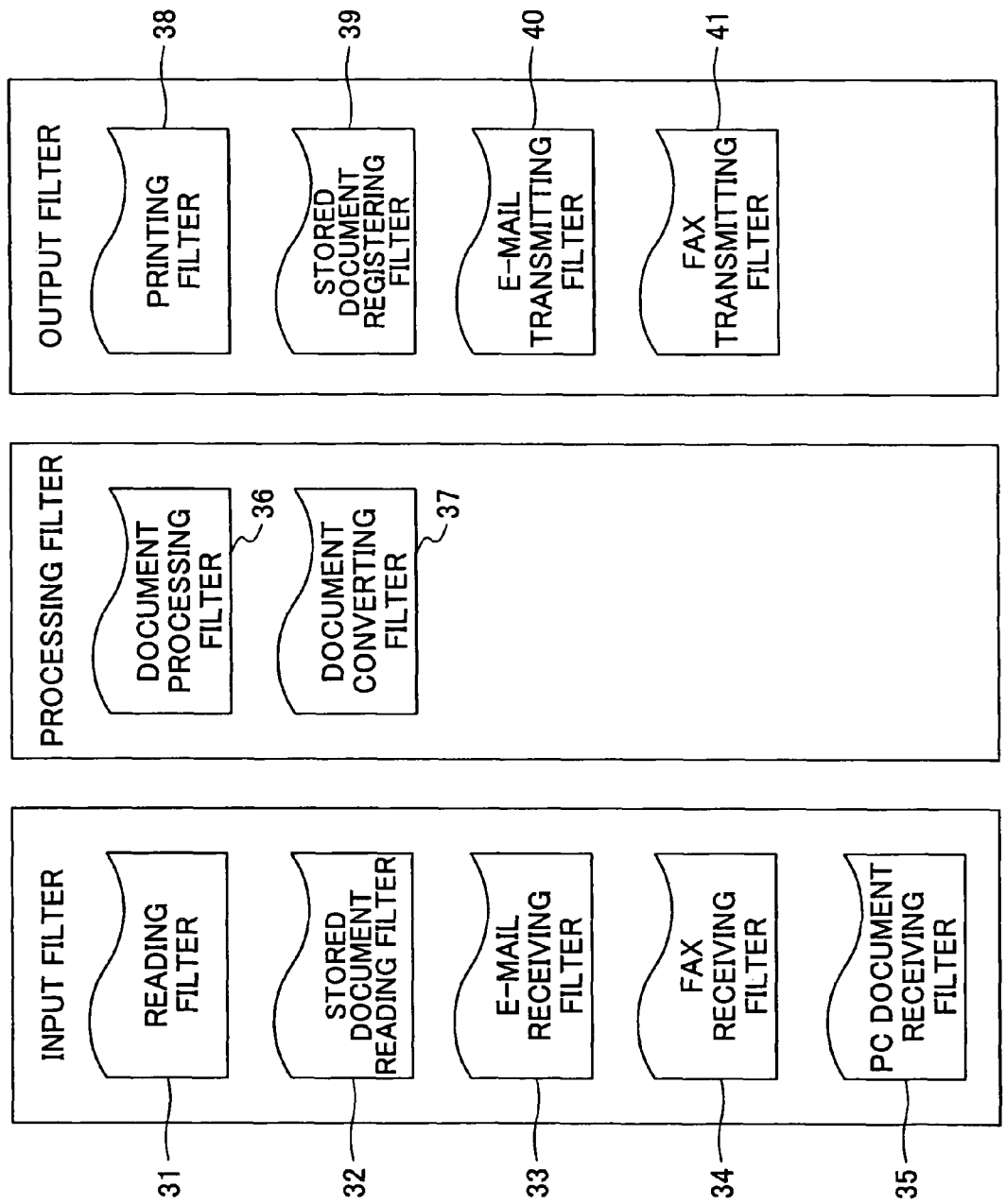

FIG.4

| FUNCTION | COMBINATION OF FILTERS |
|---|---|
| COPY | READING FILTER+DOC. PROCESSING FILTER+PRINTING FILTER |
| PRINT | PC DOC. RECEIVING FILTER+DOC. CONVERTING FILTER+PRINTING FILTER |
| SCAN_TO_E-MAIL | READING FILTER+DOC. PROCESSING FILTER+E-MAIL TRANSMITTING FILTER |
| FAX_TRANSMIT | READING FILTER+DOC. PROCESSING FILTER+FAX TRANSMITTING FILTER |
| FAX_RECEIVE | FAX RECEIVING FILTER+DOC. PROCESSING FILTER+PRINTING FILTER |
| DOC. BOX STORE | READING FILTER+STORED DOC. REGISTERING FILTER |
| DOC. BOX PRINT | STORED DOC. READING FILTER+PRINTING FILTER |

FIG.6

| CONTROL CODE | FUNCTION OF MULTI-FUNCTION PERIPHERAL | | | |
|---|---|---|---|---|
| | PRINT PROCESS | MAIL TRANSMIT PROCESS | PC DOC. TR. PROCESS | FAX TRANSMIT PROCESS |
| −1 | OUTPUT PERMITTED | OUTPUT PERMITTED | OUTPUT PERMITTED | OUTPUT PERMITTED |
| 1 | OUTPUT INHIBITED | OUTPUT INHIBITED | OUTPUT INHIBITED | OUTPUT INHIBITED |
| 2 | OUTPUT INHIBITED | ENCRYPT. TRANSMIT | ENCRYPT. TRANSMIT | OUTPUT INHIBITED |
| 3 | OUTPUT INHIBITED | ENCRYPT.+ NONPRINT PDF TRANSMIT | ENCRYPT.+ NONPRINT PDF TRANSMIT | OUTPUT INHIBITED |
| 4 | OUTPUT PERMITTED | OUTPUT INHIBITED | OUTPUT INHIBITED | OUTPUT INHIBITED |
| 5 | OUTPUT PERMITTED | ENCRYPT.+ NONPRINT PDF TRANSMIT | ENCRYPT.+ NONPRINT PDF TRANSMIT | OUTPUT INHIBITED |
| 6 | OUTPUT PERMITTED | TRANSMIT TO REG. ADDR. PERMITTED | TRANSMIT TO REG. ADDR. PERMITTED | TRANSMIT TO REG. ADDR. PERMITTED |

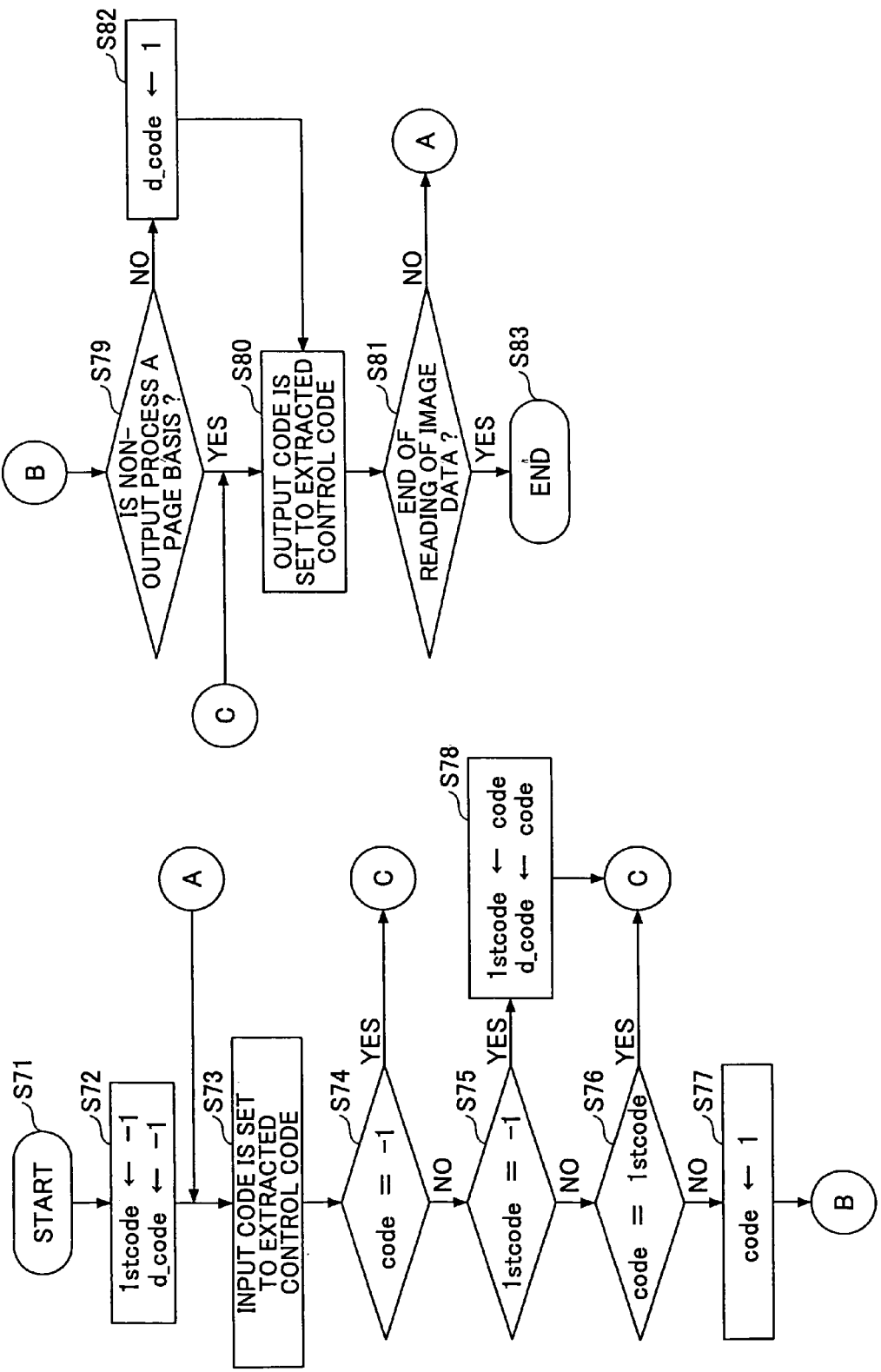

FIG.8

| INPUT SEQ. | INPUT CODE | 1ST CODE | OUTPUT CODE | d_code PAGE BASIS | d_code DOC. BASIS |
|---|---|---|---|---|---|
| 1 | −1 | −1 | −1 | −1 | −1 |
| 2 | 2 | 2 | 2 | 2 | 2 |
| 3 | −1 | 2 | −1 | 2 | 2 |
| 4 | 5 | 2 | 1 | 2 | 1 |
| 5 | 2 | 2 | 2 | 2 | 1 |
| 6 | 3 | 2 | 1 | 2 | 1 |

FIG.12

| INPUT SEQ. | INPUT CODE | 1ST CODE | OUTPUT CODE | d_code | |
|---|---|---|---|---|---|
| | | | | PAGE BASIS | DOC. BASIS |
| 1 | 2 | 2 | 2 | 2 | 2 |
| 2 | 6 | 2 | 1 | 2 | 1 |
| 3 | 2 | 2 | 2 | 2 | 1 |

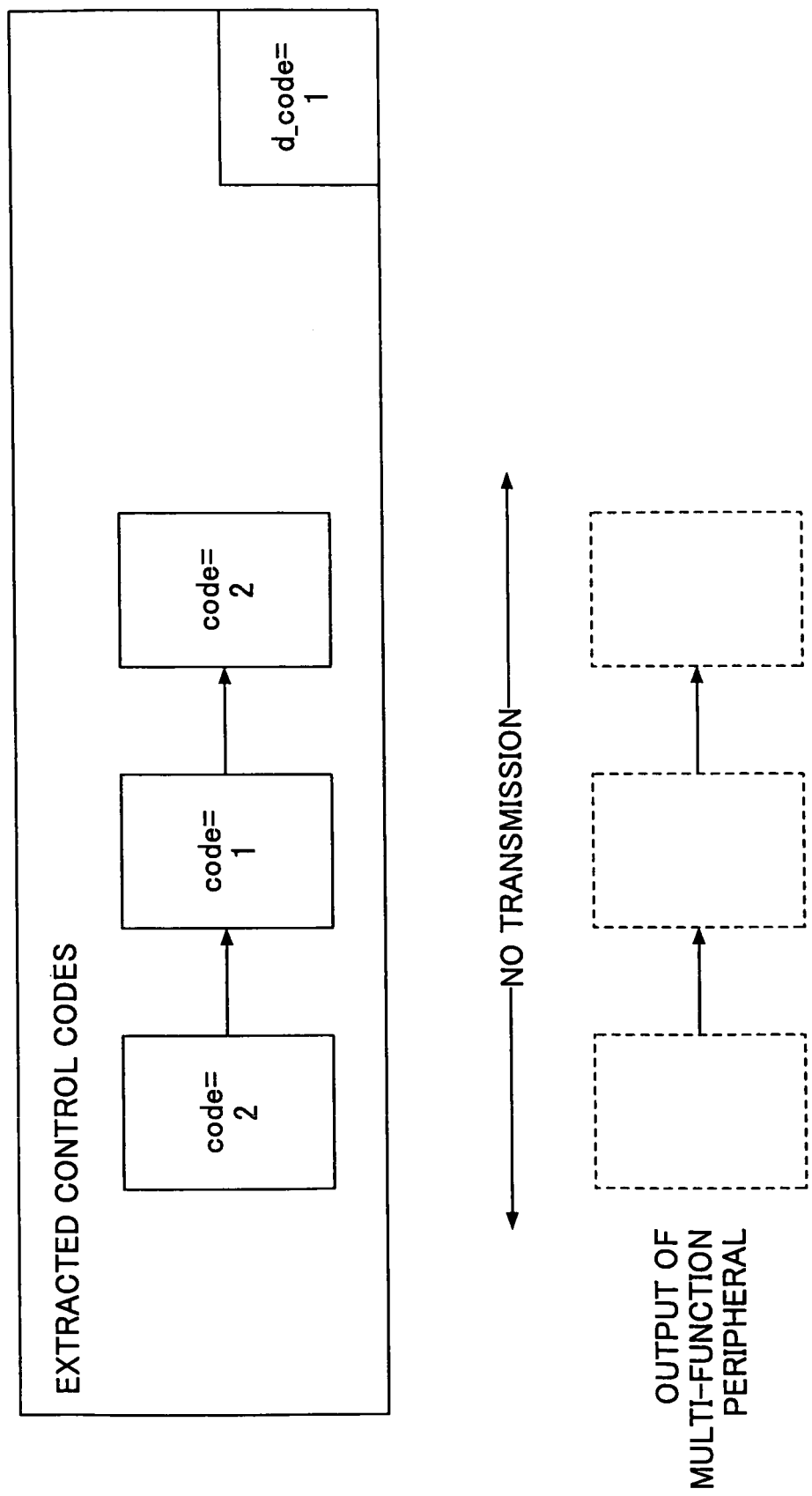

IMAGE PROCESSING DEVICE AND METHOD FOR DETERMINING IMAGE DATA PROCESSES BASED ON ADDITIONAL INFORMATION

BACKGROUND OF THE INVENTION

1. Field of the Invention

This invention relates to an image processing device which performs processing of output image data on a page basis or on a document basis.

2. Description of the Related Art

Conventionally, there is proposed an image processing method in which additional information indicating that image data of concern is secret data is extracted from the image data of concern and the copying of the image data is inhibited according to the extracted additional information. As application of the above method, there is also proposed an image processing method which performs processing of image data in accordance with the extracted additional information. Generally, the additional information added to image data may be used in digital watermarking or may be used as a ground tint added to image data.

Japanese Laid-Open Patent Application No. 2004-200962 discloses an image processing method in which, when copying a series of document images, the dot pattern added to each document image is detected, and the processing to be performed for the series of document images as a whole is determined. According to this method, even when a secret data is contained only in a part of the series of document images which are to be copied, the copying of the series of document images as a whole is inhibited. This method is intended to prevent leaking of confidential information certainly.

However, in the method of Japanese Laid-Open Patent Application No. 2004-200962, the outputting of all the document images is inhibited, and there is a problem that this method lacks the user friendliness. For example, even when the user desires to copy the other document images different from a document image containing secret data, the copying of the other document images is impossible according to the method of Japanese Laid-Open Patent Application No. 2004-200962.

Moreover, if a series of document images except for a document image-containing secret data are copied, the person who receives the copied documents may recognize accidentally that the original document images do not contain any secret data. Therefore, there is also a possibility that the credibility of the original documents may fall.

SUMMARY OF THE INVENTION

In one aspect of the invention, the present disclosure provides an improved image processing device and method in which the above-described problems are eliminated.

In one aspect of the invention, the present disclosure provides an image processing device, an image processing method, an image processing program, and a recording medium which are capable of improving the user friendliness.

In an embodiment of the invention which solves or reduces one or more of the above-mentioned problems, the present disclosure provides an image processing device which extracts additional information from image data, the image processing device comprising: an input unit configured to input a plurality of image data items; an additional information extracting unit configured to extract an additional information item from each of the plurality of image data items input by the input unit; and a determining unit configured to determine a process to be performed for each image data item based on the extracted additional information item, wherein the determining unit is configured to determine a process to be performed for an image-data group containing the plurality of image data items, based on a plurality of additional information items extracted from the plurality of image data items, and determine a process to be performed for each image data item based on a corresponding one of the plurality of additional information items.

In an embodiment of the invention which solves or reduces one or more of the above-mentioned problems, the present disclosure provides an image processing method for use in an image processing device which extracts additional information from image data, comprising: an input step of inputting a plurality of image data items; an additional information extracting step of extracting an additional information item from each of the plurality of image data items input in the input step; and a determining step of determining a process to be performed for each image data item based on the extracted additional information item, wherein the determining step is configured to determine a process to be performed for an image-data group containing the plurality of image data items, based on a plurality of additional information items extracted from the plurality of image data items, and determine a process to be performed for each image data item based on a corresponding one of the plurality of additional information items.

According to the invention, it is possible to provide the image processing device, the image processing method, the image processing program, and the recording medium which are capable of improving the user friendliness.

Other objects, features and advantages of the present invention will become more apparent from the following detailed description when read in conjunction with the accompanying drawings.

BRIEF DESCRIPTION OF THE DRAWINGS

FIG. 3 is a diagram showing examples of an input filter, a processing filter, and an output filter in an embodiment of the invention.

FIG. 4 is a diagram showing examples of the combination of the filters for performing each function in a multi-function peripheral of an embodiment of the invention.

FIG. 6 is a diagram for explaining the relationship between the control code and the corresponding function of the multi-function peripheral of the present embodiment.

FIG. 7 is a flowchart for explaining the algorithm which extracts additional information from image data which is used in an additional information extracting unit of the image processing device of this embodiment.

FIG. 8 is a diagram showing examples of the additional information extracted by the algorithm of FIG. 7.

FIG. 12 is a diagram showing an example of control codes extracted by the algorithm of FIG. 7.

FIG. 14 is a diagram showing an example of an output of the multi-function peripheral of the present embodiment.

DETAILED DESCRIPTION OF THE PREFERRED EMBODIMENTS

A description will be given of embodiments of the invention with reference to the accompanying drawings.

Figure 1:
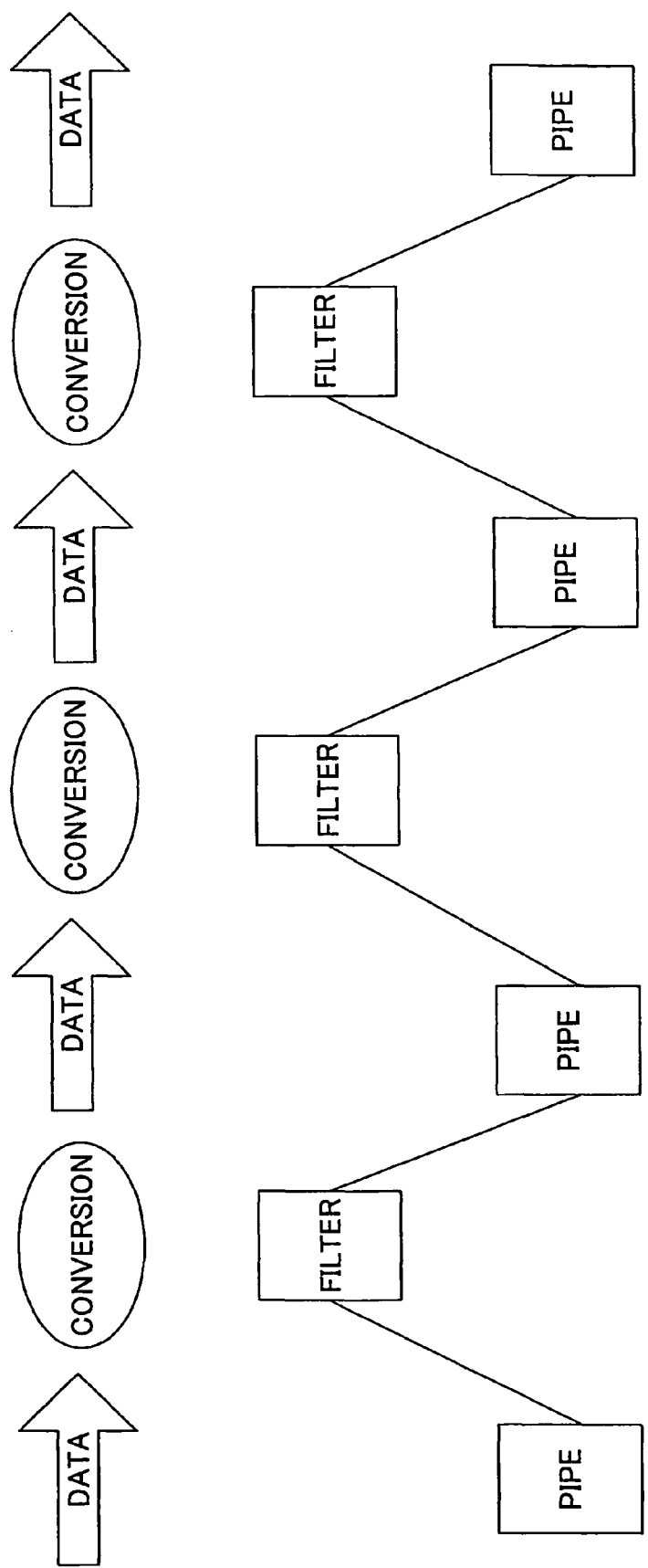
FIG. 1 is a diagram for explaining the concept of a pipe and filter architecture.

The concept of a pipe and filter architecture adopted in the software architecture of a multi-function peripheral which is an embodiment of the image processing device of the invention will be described. FIG. 1 is a diagram for explaining the concept of the pipe and filter architecture.

As shown in FIG. 1, filters are connected by pipes respectively. Each filter receives input image data, converts the input image data, and outputs the resulting image data. Each pipe transfers the image data output from a filter to the following filter.

Each of the functions arranged in the multi-function peripheral of the present embodiment may be regarded as a series of conversions of document data (image data). Each function of the multi-function peripheral may be generalized into inputting of document data, processing of the input document data, and outputting of the processed document data. If the inputting, the processing, and the outputting are regarded as conversions, a software component which carries out one conversion may constitute a filter.

Specifically, a filter which carries out the inputting of document data is called input filter, a filter which carries out the processing of the input document data is called processing filter, and a filter which carries out the outputting of the processed document data is called output filter.

These filters are independent of each other, and, fundamentally, there is no dependent relationship between the filters (or there is no calling or called relationship between the filters. Therefore, the addition (installation) or deletion (uninstallation) of filters per filter in the software of the multi-function peripheral of the present embodiment may be carried out.

Figure 2:
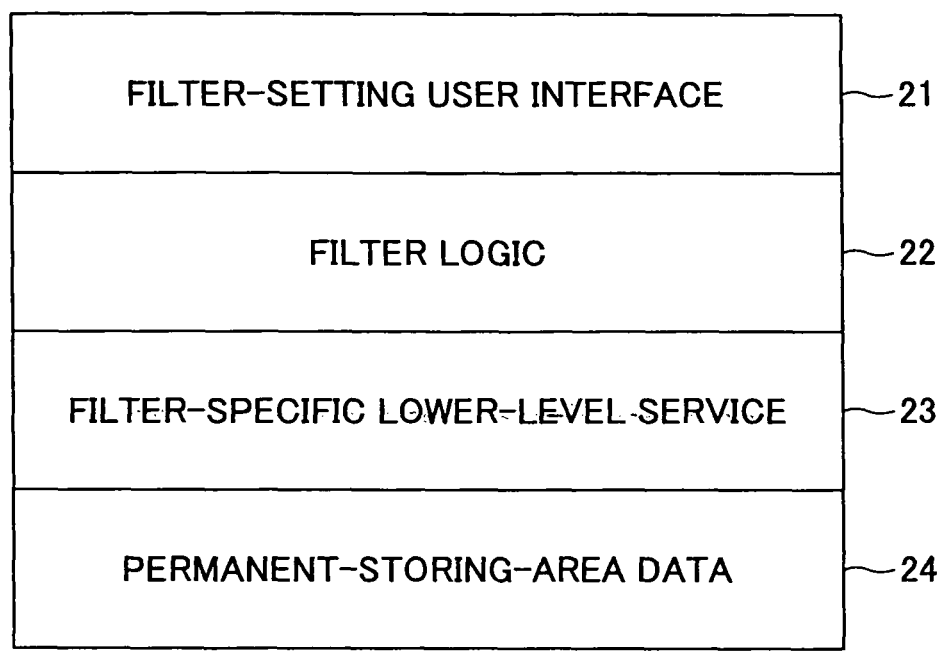
FIG. 2 is a block diagram showing the components of a filter.

Next, the components of a filter will be described. FIG. 2 is a block diagram showing the components of a filter.

As shown in FIG. 2, the filter includes a filter-setting user interface (UI) 21, a filter logic 22, a filter-specific lower-level service 23, and a permanent-storage-area data 24.

The filter-setting user interface 21 is a program which is configured to display a screen for requesting the user to set up the execution conditions of a filter, on an operation panel of the multi-function peripheral. For example, in a case of a reading filter which is one of input filters, a screen for requesting the user to set up the resolution, the concentration, and the image classification of the reading filter is displayed on the operation panel by the filter-setting user interface 21.

In a case where displaying a screen on the operation panel is performed based on HTML (HyperText Markup Language) data or scripts, the filter-setting user interface may be implemented in a form of HTML data or scripts.

The filter logic 22 is a program in which the logic for performing the functions of the filter is implemented. For example, in a case of a reading filter, the filter logic 22 is a program in which the logic for performing control of the document reading by the scanner is implemented.

The filter-specific lower-level service 23 is a lower-level function (library) needed for performing the filter logic 22. For example, in a case of a reading filter, the filter-specific lower-level service 23 is a lower-level function for controlling the scanner.

The permanent-storage-area data 24 corresponds to the schema definition of the data needed for being stored in the non-volatile memory of the multi-function peripheral. The permanent-storage-area data 24 is, for example, the setting information of the filter (which may include the defaults of the execution conditions).

FIG. 3 is a diagram showing examples of the input filter, the processing filter, and the output filter of the multi-function peripheral of this embodiment.

As shown in FIG. 3, the input filter includes a reading filter 31, a stored document reading filter 32, an e-mail receiving filter 33, a FAX receiving filter 34, and a PC document receiving filter 35.

The reading filter 31 controls the reading of image data by the scanner and outputs the read image data. The stored document reading filter 32 reads out a document data (image data) stored in the storage unit of the multi-function peripheral and outputs the read document data. The e-mail receiving filter 33 receives an e-mail via the network (not shown) and outputs the data contained in the e-mail. The FAX receiving filter 34 controls the FAX receiving function of the multi-function peripheral and outputs the received image data. The PC document receiving filter 35 receives a print data from a client personal computer (not shown) via the network and outputs the received print data.

The processing filter includes a document processing filter 36 and a document converting filter 37. The document processing filter 36 performs a predetermined image conversion process (integration, expansion, or reduction) for the input image data and outputs the resulting image data. The document converting filter 37 performs a rendering process. For example, the document converting filter 37 converts the input PostScript data into a bit map data and outputs the bit map data.

The output filter includes a printing filter 38, a stored document registering filter 39, an e-mail transmitting filter 40, and a FAX transmitting filter 41. The printing filter 38 causes the plotter of the multi-function peripheral to output the input image data (printing). The stored document registering filter 39 stores the input image data in the hard disk of the multi-function peripheral. The e-mail transmitting filter 40 attaches the input image data to an e-mail and transmits the e-mail. The FAX transmitting filter 41 causes the FAX transmitting function of the multi-function peripheral to transmit a FAX of the input image data.

FIG. 4 is a diagram showing examples of the combination of the filters for performing each of the functions (applications) in the multi-function peripheral of this embodiment.

For example, the copy function is performed by connecting the reading filter 31 and the printing filter 38. In this case, an image data is read from a document by the reading filter 31, and the image data read by the reading filter 31 is printed by the printing filter 38.

When execution of a process accompanied with the copy function, such as integration, expansion, reduction, etc., is requested, the document processing filter 36 which carries out the process is inserted between the reading filter 31 and the printing filter 38.

The print function (the function to print a document data from a client PC) is performed by connecting the PC document receiving filter 35, the document converting filter 37, and the printing filter 38.

The scan_to_e-mail function (the function to transmit the scanned image data by e-mail) is performed by connecting the reading filter 31 and the mail transmitting filter 40.

The FAX transmitting function is performed by connecting the reading filter 31 and the FAX transmitting filter 34.

The FAX receiving function is performed by connecting the FAX receiving filter 34 and the printing filter 38.

The document box storing function (the function to store the scanned image data in the multi-function peripheral) is performed by connecting the reading filter 31 and the stored document registering filter 39.

The document box printing function (the function to print the document data stored in the multi-function peripheral) is performed by connecting the stored document reading filter 32 and the printing filter 38.

Figure 5:
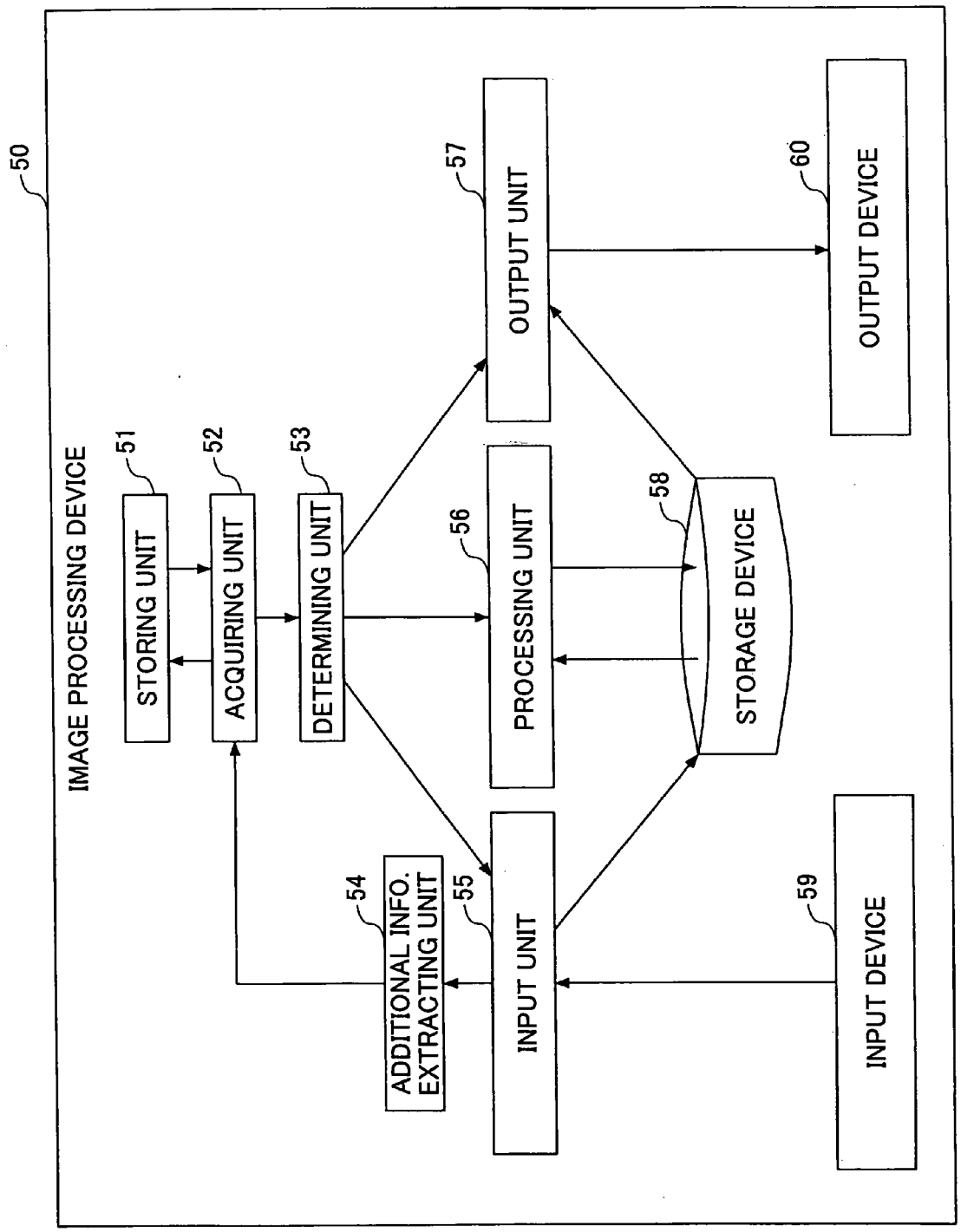
FIG. 5 is a block diagram showing the composition of an image processing device of an embodiment of the invention.

FIG. 5 is a block diagram showing the composition of an image processing device of an embodiment of the invention.

The image processing device 50 of this embodiment includes a storing unit 51, an acquiring unit 52, a determining unit 53, an additional information extracting unit 54, an input unit 55, processing unit 56, an output unit 57, a storage device 58, an input device 59, and an output device 60.

The input device 59 is a device used by the input unit 55 to acquire image data. For example, the input device 59 is equivalent to a scanner, a communication interface, etc.

The output device 60 is a device used by the output unit 57 to output image data. For example, the output device 60 is equivalent to a plotter, a communication interface, etc.

The input unit 55 performs the process equivalent to the input filter in the above-mentioned pipe and filter architecture. The input unit 55 performs any of the image-data reading process using the scanner, the e-mail receiving process, the FAX receiving process, etc.

The processing unit 56 performs the process equivalent to the processing filter in the above-mentioned pipe and filter architecture. The processing unit 56 performs a predetermined image conversion process (integration, expansion, reduction, etc.) for the input image data and a rendering process for the input image data.

The output unit 57 performs the process equivalent to the output filter in the above-mentioned pipe and filter architecture. The output unit 57 performs any of the printing process, the e-mail transmitting process, the FAX transmitting process, etc.

The additional information extracting unit 54 acquires additional information from the image data input by the input unit 55 through the input device 59. The additional information extracting unit 54 notifies the acquired additional information to the acquiring unit 52.

In this embodiment, there are two kinds of additional information. The first one is additional information which is extracted from a single image data item by the additional information extracting unit 54, and the second one is image-data-group additional information which is generated by the additional information extracting unit 54 based on a plurality of extracted additional information items. The first one is represented by a control code which specifies a process to be performed on a page basis for a single image data item by one of the input unit 55, the processing unit 56, and the output unit 57 (which control code may also be called "code"). On the other hand, the second one is represented by an image-data-group control code which specifies a process to be performed on an image-data-group basis (or on a document basis) for an image data group by each of the input unit 55, the processing unit 56, and the output unit 57 (which control code may also be called group code "d_code").

An image-data group in this embodiment means a plurality of image data items which are input from document images by the input unit 55 in a single input operation.

FIG. 6 shows the relationship between the control code and the corresponding function of the multi-function peripheral of this embodiment.

As shown in FIG. 6, each of the control codes is associated with one of the processes corresponding to the functions (printing, mail transmitting, etc.) of the multi-function peripheral of this embodiment. The printing process is to print the image data on paper using the plotter, the mail transmitting process and the PC document transmitting process are to transmit the image data by e-mail, and the FAX transmitting process is to transmit an FAX of the image data.

A non-output process in the multi-function peripheral of this embodiment means a process which does not output information of the input image data input by the input unit 55 from the multi-function peripheral to an external device outside the multi-function peripheral. Specifically, the non-output process may be a color-fill process of image data, or another process which does not perform the printing of image data or the transmission of image data.

The value of −1 in this embodiment is considered information indicating that no additional information can be acquired from image data. Suppose that the 1st code is set to additional information other than −1, and the 1st code is considered additional information which is extracted from an image-data group (or a document) by the additional information extracting unit 54 for the first time.

Next, the algorithm which acquires a control code (additional information) from image data and is used by the additional information extracting unit 54 will be described. FIG. 7 is a flowchart for explaining the algorithm which acquires a control code from image data.

As shown in FIG. 7, in step S71, the procedure of the algorithm is started when image data is input by the input unit 55 through the input device 59. In step S72, the value of −1 is substituted for the 1st code and the d_code. Namely, the values of the 1st code and the d_code are initialized to the value of −1, which is the information indicating that no control code can be acquired from image data.

Next, in step S73, a control code is extracted from the input image data, and the extracted control code is substituted for the input code, so that an initial value of the input code is set to the extracted control code of the image data.

In step S74, it is determined whether the input code is equal to −1. When the value of the input code is equal to −1 in step S74 (or when no control code can be acquired from the image data), the control is transferred to step S80.

When the value of the input code is not equal to −1 in step S74 (or when a control code can be acquired from the image data), the control is transferred to step S75.

In step S75, it is determined whether the 1st code is equal to −1. When the value of the 1st code is equal to −1 in step S75 (or when any control code has not yet been acquired from image data), in step S78, the value of the input code is substituted for the 1st code and the d_code, and the control is transferred to step S80.

On the other hand, when the value of the 1st code is not equal to −1 in step S75 (or when a certain control code is acquired from the image data), the control is transferred to step S76.

In step S76, it is determined whether the value of the input code is equal to the value of the 1st code. When the value of the input code is equal to the value of the 1st code in step S76, the control is transferred to step S80.

On the other hand, when the value of the input code is not equal to the value of the 1st code in step S76, in step S77, the value of 1 is substituted for the input code, and the control is transferred to step S79. Namely, the image processing device 50 of this embodiment is arranged not to output the image data to an external device outside the image processing device 50 when several different control codes coexist in the document images input by the input unit 55.

In step S79, it is determined whether the non-output process (which does not output the information of the input image data from the image processing device 50 to an external device) is a page basis. When the non-output process is a page basis in step S79, in step S80, the output code is set to the control code extracted from the input image data by the additional information extracting unit 54. Namely, the control code read from the image data is determined as a control code of the corresponding image data.

On the other hand, when the non-output process is a document basis in step S79, the value of 1 is substituted for the d_code in step S82, and in step S80, the output code is set to the control code extracted from the input image data by the additional information extracting unit 54. This is, the image processing device 50 of this embodiment is arranged not to output the image data to the external device outside the image processing device 50 when several different control codes coexist in the document images input by the input unit 55 and the non-output process is a document basis.

Accordingly, if the user sets up the non-output process suitably, the processes conforming with the security scheme requested by the user can be selected. It is possible to provide an image processing device capable of improving the user friendliness.

In step S81, it is determined whether the inputting of the image data by the input unit 55 is completed. When the result of the determination in step S81 is affirmative, the procedure by the additional information extracting unit 54 shown in FIG. 7 is terminated (step S83). On the other hand, when the inputting of the following image data by the input unit 55 continues in step S81, the control is transferred to step S73, so that the additional information extracting unit 54 acquires additional information from the following image data.

FIG. 8 shows examples of the control codes (the additional information) acquired by the algorithm of FIG. 7. In the example of FIG. 8, the image data are input by the input unit 55 in accordance with the input sequence.

First, in step S72, the value of −1 is substituted for the 1st code and the d_code. In step S73, the value of −1 which is a control code in the image data of the 1st sheet is substituted for the input code. Then, it is determined in step S74 that the value of the input code is equal to −1. In step S80, the value of −1 which is the value of the input code is substituted for the output code, and the value of −1 which is the value of the output code is set to the control code of the image data of the 1st sheet.

Next, in step S73, a control code of the image data of the 2nd sheet is read, and the value of 2 is substituted for the input code. Then, the result of the determination in step S74 is negative, and the result of the determination in step S75 is affirmative. In step S78, the value of 2 which is the value of the code is substituted for the 1st code and the d_code. Then, in step S80, the value of 2 which is the value of the input code is substituted for the output code, and the value of 2 which is the value of the output code is set to the control code of the image data of the 2nd sheet.

In this manner, the output code (which is the control code on a page basis) and the d_code (which the control code on a document unit) will be determined and set up for the image data of the third and subsequent sheets by the same procedure.

Referring back to FIG. 5, the storing unit 51 stores the process which is to be performed by each of the input unit 55, the processing unit 56, and the output unit 57 (which are the components of the image processing device 50), corresponding to the additional information. In response to a request from the acquiring unit 52 (which will be mentioned later), the storing unit 51 notifies the information relevant to the stored processes to the acquiring unit 52.

The storing unit 51 may be provided within the image processing device 50 as shown in FIG. 5. Alternatively, the storing unit 51 may be provided outside the image processing device 50.

The acquiring unit 52 requests the storing unit 51 to send the information relevant to the processes to be performed by each of the input unit 55, the processing unit 56, and the output unit 57, corresponding to the additional information notified from the additional information extracting unit 54.

The acquiring unit 52 receives the information relevant to the processes from the storing unit 51 and notifies the information to the determining unit 53.

The determining unit 53 receives from the acquiring unit 52 the information relevant to the processes to be performed by the input unit 55, the processing unit 56, and the output unit 57 corresponding to the additional information.

The determining unit 53 determines the processes to be performed for the image data from the input unit 55 by each of the input unit 55, the processing unit 56, and the output unit 57, based on the additional information extracted (or generated) by the additional information extracting unit 54, and notifies the determined processes to each of these units.

Moreover, the determining unit 53 determines the process to be performed on a document basis (on an image-data-group basis) by each of the input unit 55, the processing unit 56, and the output unit 57, based on the additional information indicated by the d_code.

The storage device 58 performs the process equivalent to the pipe in the above-mentioned pipe and filter architecture. Specifically, the storage device 58 is a memory which stores temporarily the processing results from the input unit 55, the processing unit 56, and the output unit 57.

In this embodiment, the input unit 55 and the processing unit 56 are arranged to store the processed image data in the storage device 58, and the processing unit 56 and the output unit 57 are arranged to read the processed image data from the storage device 58.

Next, the hardware composition of the multi-function peripheral which is an embodiment of the image processing device of the invention will be described.

Figure 9:
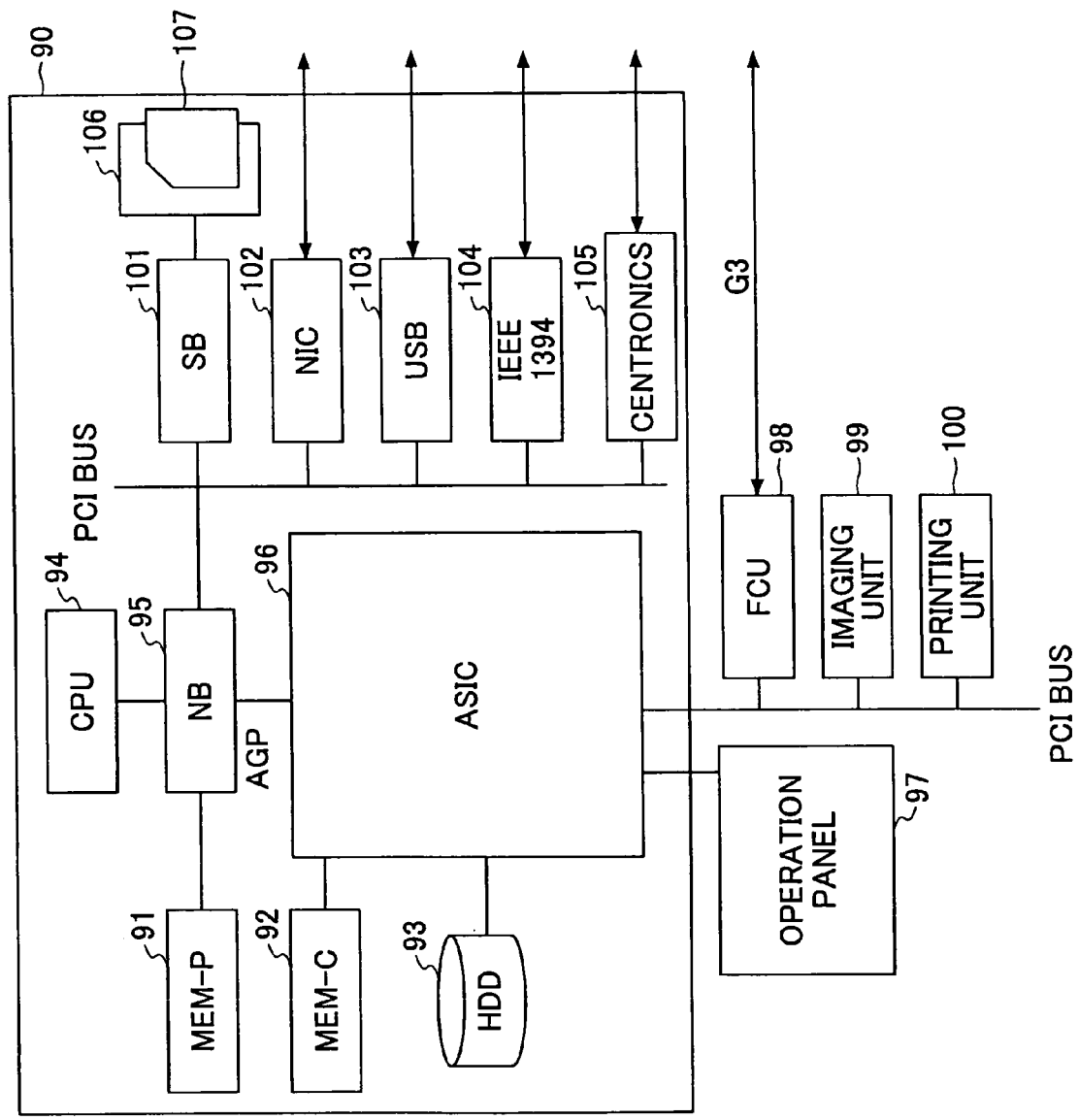
FIG. 9 is a block diagram showing the hardware composition of a multi-function peripheral of an embodiment of the invention.

FIG. 9 is a block diagram showing the hardware composition of a multi-function peripheral of an embodiment of the invention.

As shown in FIG. 9, the hardware of the multi-function peripheral of this embodiment includes a controller 90, an operation panel 97, a facsimile control unit (FCU) 98, an imaging unit (scanner) 99, and a printing unit (plotter) 100.

The controller 90 includes a CPU (central processing unit) 94, an ASIC (application-specific integrated circuit) 96, an NB (north bridge) 95, an SB (south bridge) 101, an MEM-P 91, an MEM-C 92, an HDD (hard disk drive) 93, a memory card slot 106, an NIC (network interface controller) 102, a USB (universal serial bus) device 103, an IEEE (the Institute of Electrical and Electronics Engineers) 1394 device 104, and a Centronics device 105.

The CPU 94 is an IC (integrated circuit) designed for performing various kinds of information processing. The ASIC 96 is an IC designed for performing various kinds of image processing. The NB 95 is the north bridge of the controller 90. The SB 101 is the south bridge of the controller 90. The MEM-P 91 is the system memory of the multi-function peripheral. The MEM-C 92 is the local memory of the multi-function peripheral. The HDD 93 is the storage of the multi-function peripheral. The memory card slot 106 is the slot for setting the memory card 107. The NIC 102 is a controller for performing network communications in accordance with a MAC (media access control) address. The USB device 103 is a device for detecting connection of a device conforming to the USB specifications. The Centronics device 105 is a device for detecting connection of a device conforming to the Centronics specification.

The operation panel 97 is the hardware (an operation unit) for enabling an operator to input instructions to the multi-function peripheral, as well as the hardware (a display unit) for enabling an operator to receive messages output from the multi-function peripheral.

For example, the software of the multi-function peripheral in an embodiment of the invention is stored in the MEM-C 92, and, when executed by the CPU 94, the software from the MEM-C 92 is loaded to the MEM-P 91 and execution of the software causes the CPU 94 to perform any of the functions of the multi-function peripheral.

Next, the procedure performed by the multi-function peripheral of this embodiment will be described with reference to FIG. 10.

Figure 10:
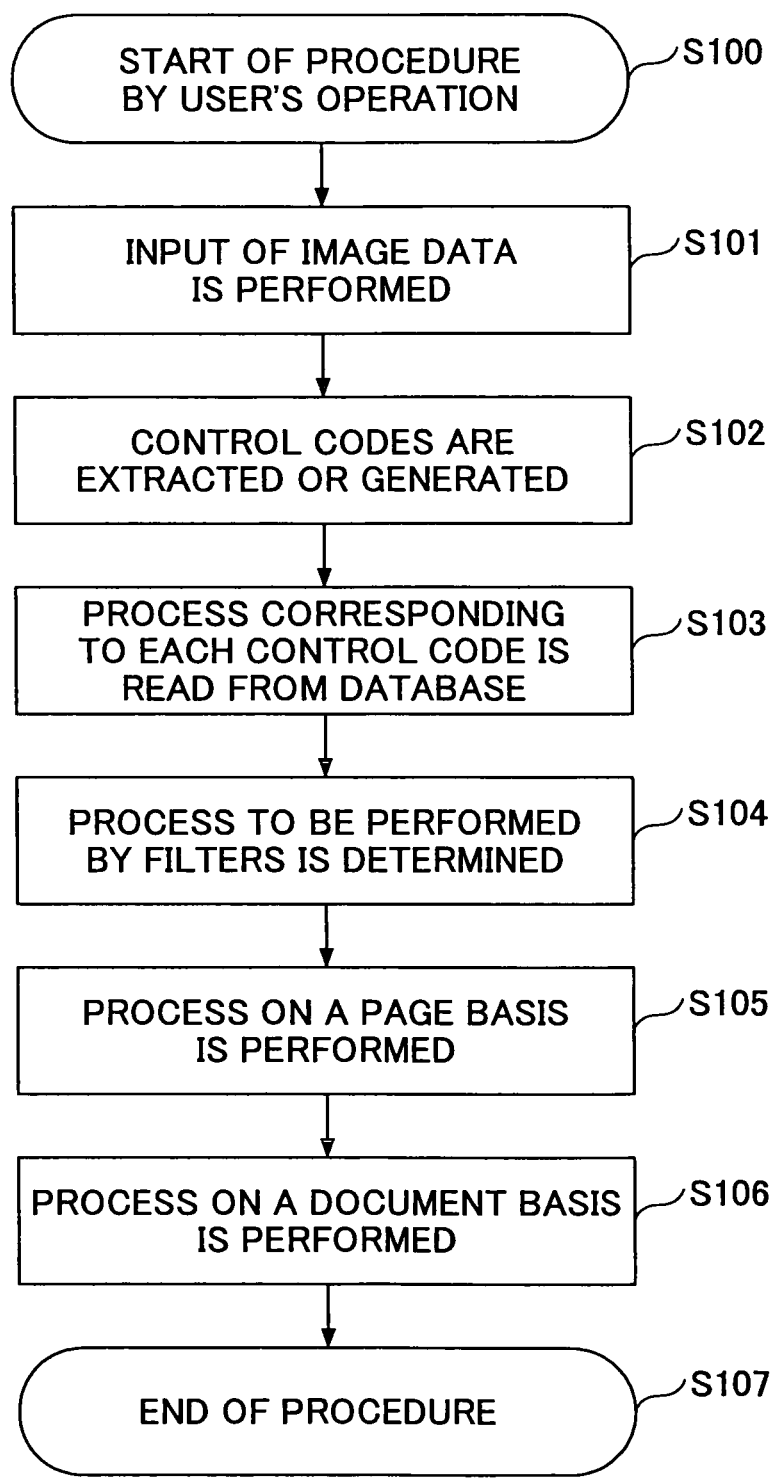
FIG. 10 is a flowchart for explaining the procedure performed by the multi-function peripheral of the present embodiment.

FIG. 10 is a flowchart for explaining the procedure performed by the multi-function peripheral of this embodiment. In the procedure of FIG. 10, it is supposed that the scan_to_e-mail function shown in FIG. 4 is performed by the multi-function peripheral. The procedure of performing the e-mail transmitting of image data items which are read from document images of three sheets by the scanner will be described with reference to FIG. 10.

When the user performs an operation to select the scan_to_e-mail function on the operation panel 97 of the multi-function peripheral, the reading filter 31, the document processing filter 36, and the e-mail transmitting filter 40, which are relevant to the scan_to_e-mail function as shown in FIG. 4, are chosen, and the processes relevant to the scan_to_e-mail function will be performed by these filters.

In this embodiment, the additional information means control codes which specify respective processes to be performed by the reading filter 31, the document processing filter 36, and the e-mail transmitting filter 40. There are two kinds of control codes: the first control codes are those extracted from the image data items by the additional information extracting unit 54; and the second control codes are those generated by the additional information extracting unit 54 based on the extracted control codes.

The first control codes in this embodiment are page basis control information which specifies the content of a process to be performed on a page basis (or on a document basis) by each filter of the reading filter 31, the document processing filter 36, and the e-mail transmitting filter 40.

On the other hand, the second control codes in this embodiment are document basis control information which specifies the content of a process to be performed on a document basis by each filter of the reading filter 31, the document processing filter 36, and the e-mail transmitting filter 40. The relationship between the control code and the corresponding function of the multi-function peripheral is as shown in FIG. 6.

The non-output process of the multi-function peripheral of this embodiment means a process which does not output the information of image data input by the input unit 55 from the multi-function peripheral to an external device outside the multi-function peripheral. Specifically, the non-output process is a color-fill process of input image data, or another non-output process which does not perform the printing of input image data or the transmission of input image data.

In a case in which the non-output process is a color-fill process, the non-output process is determined as being the process to be performed on a page basis, and in a case in which the non-output process is an e-mail non-transmission process, the non-output process is determined as being the process to be performed on a document basis (or on an image-data-group basis).

(1) The Case in Which the Non-Output Process is a Color-Fill Process (or the Non-Output Process is a Page Basis)

As a first example, the procedure of FIG. 10 when the color-fill process as the non-output process is performed by the multi-function peripheral of this embodiment, and the non-output process is determined as being the process to be performed on a page basis will be described.

In step S100, the procedure of the multi-function peripheral of this embodiment is started by the user's operation to select the scan_to_e-mail function.

In step S101, document images are scanned by the imaging unit 99 (scanner) which serves as the input device 59, and the inputting of image data items from the scanned document images is performed by the input unit 55.

In this example, the document images of three sheets are read and the e-mail transmission of the image data is performed. Thus, in step S101, the document images of three sheets are scanned and the image data items read from the three document images are input by the input unit 55.

Figure 11:
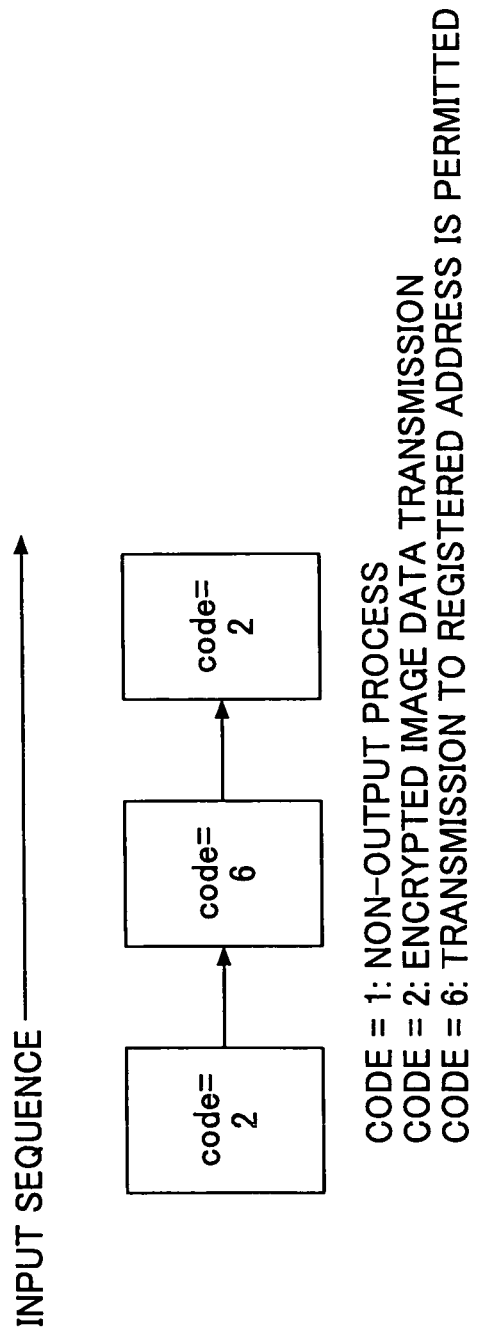
FIG. 11 is a diagram showing an example of document images read by the multi-function peripheral of the present embodiment.

FIG. 11 shows an example of the document images read in step S101. Suppose that, in this example, the control codes of 2, 6, and 2 are embedded in the document images beforehand. As shown in FIG. 6, the respective processes of the functions of the multi-function peripheral corresponding to the control codes are set up as follows: as for the control code=1, the non-output process is set up; as for the control code=2, the encryption process at the time of the mail transmission is set up; and as for the control code=6, the process in which only the e-mail transmission to registered addresses in an address book is permitted is set up. The setup of the processes of the functions of the multi-function peripheral may be modified suitably.

Next, in step S102, a control code is extracted (or generated) from each of the three input image data items by the additional information extracting unit 54 according to the algorithm of FIG. 7. FIG. 12 shows an example of control codes which are extracted (or generated) by the additional information extracting unit 54.

In this embodiment, the non-output process is a color-fill process (or the non-output process is a page basis). For this reason, the extracted control codes of page basis (the output code in FIG. 12) are set to 2, 1, and 2, respectively. And the generated control code of document basis is set to 2.

The control codes extracted by the additional information extracting unit 54 differ from the control codes of original document images because this embodiment is the case in which different control codes coexist as in the steps S76 and S77 of FIG. 7. In this embodiment, the input control code (=6) of the 2nd document image is replaced by the output control code (=1). In this manner, when different control codes coexist, it is possible to avoid the problem that the process to be performed becomes uncertain due to the different control codes, so that the processing scheme in the multi-function peripheral may be clarified.

In step S103, corresponding to the control codes extracted (or generated) by the additional information extracting unit 54, the information indicating the process to be performed by each filter of the reading filter 31, the document processing filter 36, and the e-mail transmitting filter 40 for the input image data is read from the database.

Specifically, the additional information extracting unit 54 notifies to the acquiring unit 52 the extracted (or generated) control codes of page basis and document basis, and the acquiring unit 52 requests the storing unit 51 that the storing unit 51 should notify the contents of the processes corresponding to the notified control codes to the acquiring unit 52. In response to the request, the storing unit 51 notifies the contents of the processes corresponding to the control codes to the acquiring unit 52.

In step S104, the determining unit 53 determines the process to be performed by each filter of the reading filter 31, the document processing filter 36, and the e-mail transmitting filter 40 for the image data corresponding to the control code extracted (or generated) by the additional information extracting unit 54.

Specifically, the acquiring unit 52 notifies the contents of the processes corresponding to the control codes received from the storing unit 51 to the determining unit 53, and the determining unit 53 notifies the contents of the processes received from the acquiring unit 52, to the reading filter 31, the document processing filter 36, and the e-mail transmitting filter 40.

Figure 13:
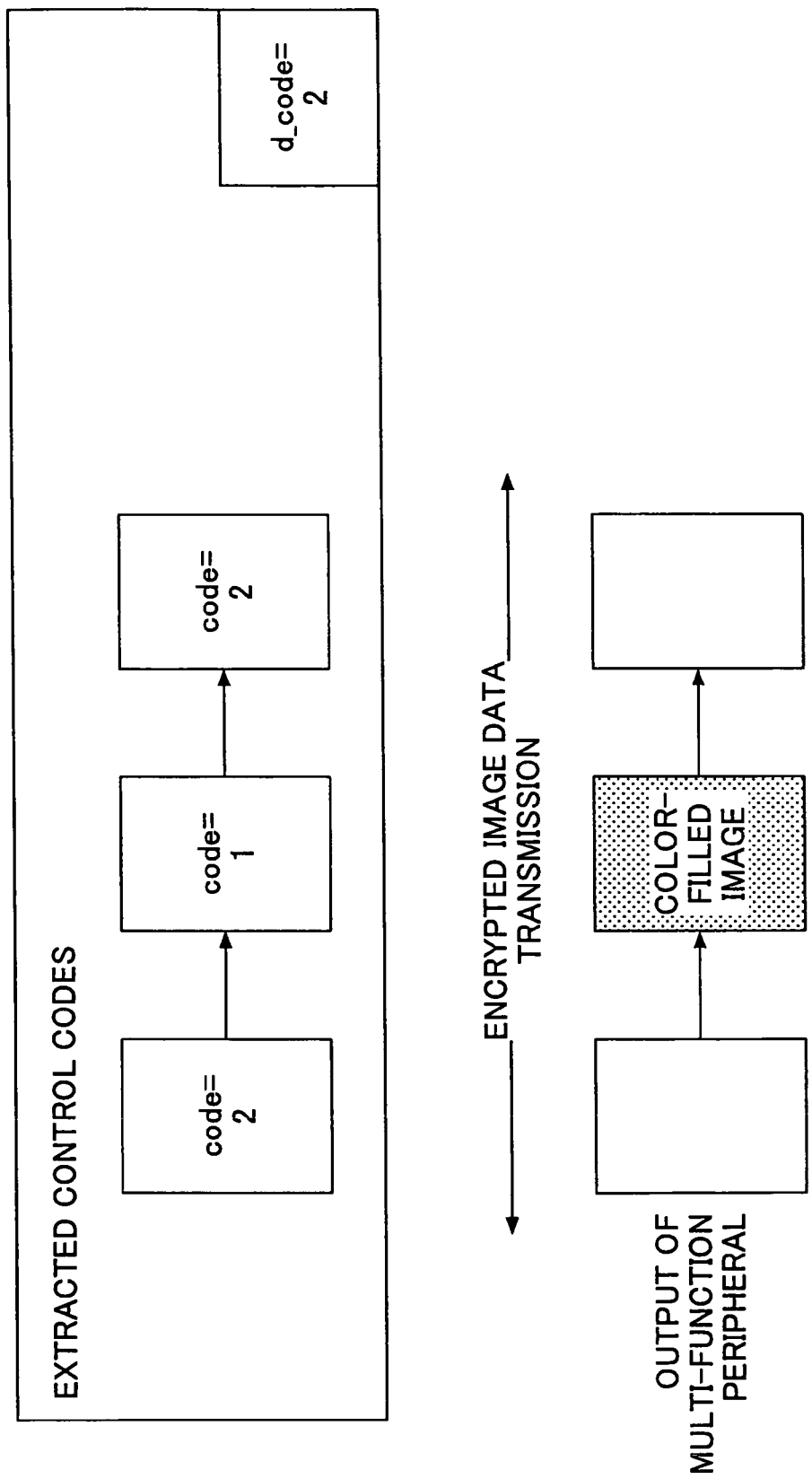
FIG. 13 is a diagram showing an example of an output of the multi-function peripheral of the present embodiment.

In step S105, the above-mentioned filters perform the processes of page basis corresponding to the control codes extracted by the additional information extracting unit 53. FIG. 13 shows an example of the output of the multi-function peripheral of this embodiment.

As shown in FIG. 13, there is no process of page basis corresponding to the control code=2, and any processing is not performed for the image data item of the 1st sheet document image and for the image data item of the 3rd sheet document image. In the example of FIG. 13, the process corresponding to the control code=1 is performed by the document processing filter 36, and the color-fill process of image data (which is the non-output process) is performed for the image data item of the 2nd sheet document image. Because the reading filter 31 and the e-mail transmitting filter 40 do not have any process which should be performed for the image data item of the 2nd sheet document image, these filters do not perform any process.

Next, in step S106, the above-mentioned filters perform the process of document basis corresponding to the control code generated by the additional information extracting unit 53.

As shown in FIG. 13, based on the control code=2 of document basis, the e-mail transmitting filter 40 performs encryption of the three image data items for which the processes of page basis are performed in step S105, and performs the e-mail transmission of the resulting image data.

Specifically, the image data items of the 1st and 3rd sheet document images are encrypted, the image data item of the 2nd sheet document image after the color-fill process is performed is encrypted, and the e-mail transmission of the resulting image data is performed through the NIC 102.

After the above step is performed, in step S107, the procedure by the multi-function peripheral of this embodiment is terminated.

Accordingly, the user on the multi-function peripheral of this embodiment is able to set up the processes to be performed either on a page basis or on a document basis for the input image data, and it is possible to provide an image processing device capable of improving the user friendliness.

(2) The Case in which the Non-Output Process is an E-mail Non-Transmission Process (or when the Non-Output Process is a Document Basis)

As a second example, the procedure of FIG. 10 when the e-mail non-transmission process as the non-output process is performed by the multi-function peripheral of this embodiment, and the non-output process is determined as being the process to be performed on a document basis will be described.

In step S100, the procedure of the multi-function peripheral of this embodiment is started by the user's operation to select the scan_to_e-mail function.

In step S101, document images are scanned by the imaging unit 99 (scanner) which serves as the input device 59, and the inputting of image data items from the scanned document images is performed by the input unit 55.

In this example, the document images of three sheets are read and the e-mail transmission of the image data is performed. Thus, in step S101, the document images of three sheets are scanned and the image data items read from the three document images are input by the input unit 55.

FIG. 11 shows an example of document images read in step S101. Suppose that, in this example, the control codes of 2, 6, and 2 are embedded in the document images beforehand.

Next, in step S102, a control code is extracted (or generated) from each of the three input image data items by the additional information extracting unit 54 according to the algorithm of FIG. 7. FIG. 12 shows an example of control codes which are extracted (or generated) by the additional information extracting unit 54.

In this embodiment, the non-output process is an e-mail non-transmission process which does not transmit the image data (the non-output process is a document basis). For this reason, the extracted control codes of page basis (the output code in FIG. 12) are set to 2, 1, and 2, respectively. And the generated control code of document basis is set to 1.

The control codes extracted by the additional information extracting unit 54 differ from the control codes of original document images because this embodiment is the case in which different control codes coexist as in the steps S76 and S77 of FIG. 7. In this embodiment, the input control code (=6) of the 2nd document image is replaced by the output control code (=1). In this manner, when different control codes coexist, it is possible to avoid the problem that the process to be performed becomes uncertain due to the different control codes, so that the processing scheme in the multi-function peripheral may be clarified.

In addition, the generated control code of document basis is set to 1, which differs from the result of the output generated in the first example. Therefore, the processes conforming with the security scheme requested by the user can be selected if the user sets up the non-output process suitably.

In step S103, corresponding to the control codes extracted (or generated) by the additional information extracting unit 54, the information indicating the process to be performed by each filter of the reading filter 31, the document processing filter 36, and the e-mail transmitting filter 40 for the input image data is read from the database.

Specifically, the additional information extracting unit 54 notifies to the acquiring unit 52 the extracted (or generated) control codes of page basis and document basis, and the acquiring unit 52 requests the storing unit 51 that the storing unit 51 should notify the contents of the processes corresponding to the notified control codes to the acquiring unit 52. In response to the request, the storing unit 51 notifies the contents of the processes corresponding to the control codes to the acquiring unit 52.

In step S104, the determining unit 53 determines the process to be performed by each filter of the reading filter 31, the document processing filter 36, and the e-mail transmitting filter 40 for the image data corresponding to the control code extracted (or generated) by the additional information extracting unit 54.

Specifically, the acquiring unit 52 notifies the contents of the processes corresponding to the control codes received from the storing unit 51 to the determining unit 53, and the determining unit 53 notifies the contents of the processes received from the acquiring unit 52, to the reading filter 31, the document processing filter 36, and the e-mail transmitting filter 40.

In step S105, the above-mentioned filters perform the processes of page basis corresponding to the control codes extracted by the additional information extracting unit 53. FIG. 14 shows an example of the output of the multi-function peripheral of this embodiment.

As shown in FIG. 14, there is no process of page basis corresponding to the control code=2 or =1, and any processing is not performed for each image data item of the 1st, the 2nd, and the 3rd sheet document images.

Next, in step S106, the above-mentioned filters perform the process of document basis corresponding to the control code generated by the additional information extracting unit 53.

As shown in FIG. 14, based on the control code=1 of document basis, the e-mail transmitting filter 40 does not perform the e-mail transmission of the image data of the three sheet document images.

After the above step is performed, in step S107, the procedure by the multi-function peripheral of this embodiment is terminated.

Accordingly, if the user sets up the non-output process suitably, the processes conforming with the security scheme requested by the user can be selected. It is possible to provide an image processing device capable of improving the user friendliness.

The present invention is not limited to the specifically disclosed embodiments, and variations and modifications may be made without departing from the scope of the present invention.

The present application is based on Japanese patent application No. 2007-286729, filed on Nov. 2, 2007, and Japanese patent application No. 2008-267838, filed on Oct. 16, 2008, the contents of which are incorporated herein by reference in their entirety.

What is claimed is:

1. An image processing device which extracts additional information from image data, comprising:
   an input unit configured to input a plurality of image data items input from document images;
   an additional information extracting unit configured to extract an additional information item including a first control code, representing a process to be performed on a page basis by one of the input unit, a processing unit and an output unit, from each of the plurality of image data items input by the input unit of the image processing device; and
   a determining unit configured to determine a process to be performed on a page basis and a document basis for each image data item based on the extracted additional information item, wherein
      the determining unit is configured to determine an image-data group process to be performed on a document basis for an image-data group containing the plurality of image data items, based on a plurality of additional information items extracted from the plurality of image data items, and to determine an image-data item process to be performed on a page basis for each image data item based on a corresponding one of the plurality of additional information items, and wherein
      the additional information extracting unit is further configured to generate a group-basis additional information item indicating an image-data-group process to be performed on a document basis, in accordance with a second control code, representing a process to be performed by each of the input unit, the processing unit and the output unit, indicating a non-output process which does not output the image data from the image processing device to an external device.

2. The image processing device according to claim 1, wherein the additional information extracting unit generates a group-basis additional information indicating a process to be performed for the image-data group, based on the plurality of additional information items extracted from the plurality of image data items, and the determining unit determines a process to be performed for the image-data group, based on the group-basis additional information item generated by the additional information extracting unit.

3. The image processing device according to claim 1, wherein the determining unit determines a process to be performed on an image-data-group basis, in accordance with a unit of processing of image data items for which a non-output process which does not output the image data from the image processing device to an external device is to be performed.

4. The image processing device according to claim 1, wherein, when the plurality of image data items are input and a first additional information item extracted from a first image data item among the plurality of image data items in the image-data group by the additional information extracting unit differs from a second additional information item extracted from an image data item other than the first image data item, the additional information extracting unit replaces the second additional information item by an additional information item indicating a non-output process which does not output the image data from the image processing device to an external device.

5. The image processing device according to claim 1, wherein the image-data group is a plurality of image data items which are input from document images by the input unit in a single input operation.

6. The image processing device according to claim 1, wherein the non-output process includes executing a non-output process on a page basis and a non-output process on a document basis in accordance with the first and second control codes.

7. An image processing method for use in an image processing device which extracts additional information from image data, comprising:
   an input step of inputting a plurality of image data items from document images;
   an additional information extracting step of extracting an additional information item including a first control code, representing a process to be performed on a page basis by one of the input unit, a processing unit and an output unit, from each of the plurality of image data items input in the input step; and
   a determining step of determining an image-data group process to be performed on a page basis and a document basis for each image data item based on the extracted additional information item,
   wherein the determining step is configured to determine a process to be performed on a document basis for an image-data group containing the plurality of image data items, based on a plurality of additional information items extracted from the plurality of image data items, and to determine an image-data item process to be performed on a page basis for each image data item based on a corresponding one of the plurality of additional information items, wherein wherein the additional information extracting step is configured to generate a group-basis additional information item indicating a process to be performed on a document basis, in accordance with an additional information item including a second control code, representing a process to be performed by each of the input unit, the processing unit and the output unit, indicating a non-output process which does not output the image data from the image processing device to an external device.

8. The image processing method according to claim 7, wherein the additional information extracting step is configured to generate a group-basis additional information indicating a process to be performed for the image-data group, based on the plurality of additional information items extracted from the plurality of image data items, and the determining step is configured to determine a process to be performed for the image-data group, based on the group-basis additional information item generated in the additional information extracting step.

9. The image processing method according to claim 7, wherein the determining step is configured to determine a process to be performed on an image-data-group basis, in accordance with a unit of processing of image data items for which a non-output process which does not output the image data from the image processing device to an external device is to be performed.

10. The image processing method according to claim 7, wherein, when the plurality of image data items are input and a first additional information item extracted from a first image data item among the plurality of image data items in the image-data group in the additional information extracting step differs from a second additional information item extracted from an image data item other than the first image data item, the additional information extracting step is configured to replace the second additional information item by an additional information item indicating a non-output process which does not output the image data from the image processing device to an external device.

11. The image processing method according to claim 7, wherein the non-output process includes executing a non-output process on a page basis and a non-output process on a document basis in accordance with the first and second control codes.

12. A non-transitory computer-readable recording medium storing an image processing program which, when executed by a computer, causes the computer to perform an image processing method for use in an image processing device which extracts additional information from image data, the image processing method comprising:

an input step of inputting a plurality of image data items input from document images;

an additional information extracting step of extracting an additional information item including a first control code, representing a process to be performed on a page basis by one of the input unit, a processing unit and an output unit, from each of the plurality of image data items input in the input step; and a determining step of determining a process to be performed on a page basis and a document basis for each image data item based on the extracted additional information item, wherein the determining step is configured to determine an image-data group process to be performed on a document basis for an image-data group containing the plurality of image data items, based on a plurality of additional information items extracted from the plurality of image data items, and to determine an image-data item process to be performed on a page basis for each image data item based on a corresponding one of the plurality of additional information items, wherein wherein the additional information extracting step is configured to generate a group-basis additional information item indicating a process to be performed on a document basis, in accordance with an additional information item including a second control code, representing a process to be performed by each of the input unit, the processing unit and the output unit, indicating a non-output process which does not output the image data from the image processing device to an external device.

13. The computer-readable recording medium according to claim 12, wherein the additional information extracting step is configured to generate a group-basis additional information indicating a process to be performed for the image-data group, based on the plurality of additional information items extracted from the plurality of image data items, and the determining step is configured to determine a process to be performed for the image-data group, based on the group-basis additional information item generated in the additional information extracting step.

14. The computer-readable recording medium according to claim 12, wherein the non-output process includes executing a non-output process on a page basis and a non-output process on a document basis in accordance with the first and second control codes.

* * * * *